(12) United States Patent
Renault

(10) Patent No.: US 12,017,512 B2
(45) Date of Patent: *Jun. 25, 2024

(54) CRASH DETECTION SYSTEM FOR TRANSPORT REFRIGERATION UNITS

(71) Applicant: CARRIER CORPORATION, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 698 days.

This patent is subject to a terminal disclaimer.

(21) Appl. No.: 17/252,912

(22) PCT Filed: Aug. 10, 2018

(86) PCT No.: PCT/IB2018/001063
§ 371 (c)(1),
(2) Date: Dec. 16, 2020

(87) PCT Pub. No.: WO2020/030940
PCT Pub. Date: Feb. 13, 2020

(65) Prior Publication Data
US 2021/0155081 A1 May 27, 2021

(51) Int. Cl.
*B60H 1/32* (2006.01)
*B60K 15/03* (2006.01)
(Continued)

(52) U.S. Cl.
CPC ......... *B60H 1/3232* (2013.01); *B60H 1/3225* (2013.01); *B60H 1/3226* (2013.01);
(Continued)

(58) Field of Classification Search
CPC .. B60H 1/3225; B60H 1/3226; B60H 1/3232; B60H 2001/3266; B60K 15/03;
(Continued)

(56) References Cited

U.S. PATENT DOCUMENTS

| 4,223,692 A | 9/1980 | Perry |
| 4,531,379 A * | 7/1985 | Diefenthaler, Jr. .. B60H 1/3226 |
| | | 60/714 |

(Continued)

FOREIGN PATENT DOCUMENTS

| CN | 103603735 A | 2/2014 |
| CN | 103742786 A | 4/2014 |

(Continued)

OTHER PUBLICATIONS

International Search Report for International Application No. PCT/IB2018/001063, International Filing Date Aug. 10, 2018, dated May 21, 2019, 6 pages.

(Continued)

*Primary Examiner* — Eric S Ruppert
*Assistant Examiner* — Hans R Weiland
(74) *Attorney, Agent, or Firm* — CANTOR COLBURN LLP

(57) ABSTRACT

A transport refrigeration system (200) including: a first engine (26) configured to power a refrigeration unit (22); a first fuel tank (330) fluidly connected to the first engine (26) through a first fuel line (332); a first shut off valve (450) located within the first fuel line (332) proximate the first fuel tank (330); a second shut off valve (72) located within the first fuel line (332) proximate the first engine (26); a sensor system (80) configured to detect at least one of a crash of the transport refrigeration system (200), a crash of the first fuel tank (330), a fuel leak in the first fuel line (332), and an engine stall in the first engine (26); and a controller (30) configured to close the first shutoff valve (450) and second shutoff valve (72) when at least one of a crash of the transport refrigeration system (200), a crash of the first fuel tank (330), a fuel leak in the first fuel line (332), and an engine stall in first engine (26) is detected.

20 Claims, 5 Drawing Sheets

(51) Int. Cl.
*B60K 28/14* (2006.01)
*B60P 3/20* (2006.01)
*F02B 63/00* (2006.01)
*F02D 33/00* (2006.01)

(52) U.S. Cl.
CPC ........ *B60K 15/03* (2013.01); *B60K 15/03006* (2013.01); *B60K 28/14* (2013.01); *B60P 3/20* (2013.01); B60H 2001/3266 (2013.01); B60K 2015/03013 (2013.01); B60K 2015/03118 (2013.01); B60K 2015/0319 (2013.01); B60K 2015/0321 (2013.01); B60K 2015/03256 (2013.01); B60K 2015/03381 (2013.01); *F02B 63/00* (2013.01); *F02D 33/003* (2013.01)

(58) Field of Classification Search
CPC .............. B60K 15/03006; B60K 28/14; B60K 2015/0321; B60K 2015/03256; B60K 2015/03375; B60K 2015/03381; B60P 3/20; F02B 63/00; F02D 17/04; F02D 33/003; F02D 33/006; F25D 11/003; F25D 29/003; F25D 29/006
See application file for complete search history.

(56) References Cited

U.S. PATENT DOCUMENTS

| | | | |
|---|---|---|---|
| 5,284,120 A * | 2/1994 | Fukushima | ............. G01F 9/001 |
| | | | 123/497 |
| 5,291,578 A | 3/1994 | Kalami | |
| 5,452,738 A | 9/1995 | Borland et al. | |
| 5,531,290 A | 7/1996 | Furuichi et al. | |
| 5,934,379 A | 8/1999 | Ostylngen et al. | |
| 6,041,762 A | 3/2000 | Sirosh et al. | |
| 6,223,714 B1 | 5/2001 | Anderson et al. | |
| 6,640,174 B2 | 10/2003 | Schondorf et al. | |
| 7,055,640 B2 | 6/2006 | Cook | |
| 7,197,407 B2 * | 3/2007 | Schimnowski | ........... G01F 1/28 |
| | | | 702/45 |
| 7,529,606 B2 | 5/2009 | Tustanowski et al. | |
| 8,214,134 B2 | 7/2012 | Le et al. | |
| 8,881,860 B2 | 11/2014 | Cho | |
| 9,284,895 B2 * | 3/2016 | Naidu | ................... F02D 19/027 |
| 9,657,638 B2 | 5/2017 | Criel | |
| 9,751,395 B2 | 9/2017 | Faruque et al. | |
| 9,925,867 B2 | 3/2018 | Jensen et al. | |
| 9,996,757 B1 * | 6/2018 | Chan | ....................... G06F 18/29 |
| 11,117,449 B2 * | 9/2021 | Renault | .................... F02D 29/04 |
| 2002/0103590 A1 | 8/2002 | Schondorf et al. | |
| 2002/0134342 A1 | 9/2002 | Agricola et al. | |
| 2003/0005913 A1 * | 1/2003 | Shelor | ................ F02M 37/0058 |
| | | | 123/541 |
| 2005/0035657 A1 * | 2/2005 | Brummett | ............ B60H 1/3232 |
| | | | 307/10.1 |
| 2005/0051376 A1 | 3/2005 | Cook | |
| 2007/0203615 A1 | 8/2007 | Tustanowski et al. | |
| 2011/0259285 A1 * | 10/2011 | Michikawauchi | ..... F02M 31/18 |
| | | | 123/3 |
| 2012/0318014 A1 * | 12/2012 | Huff | ........................ F25B 9/008 |
| | | | 62/509 |
| 2013/0055728 A1 * | 3/2013 | Lurken | ...................... F17C 6/00 |
| | | | 62/7 |
| 2013/0238226 A1 | 9/2013 | Slaymaker et al. | |
| 2013/0284156 A1 * | 10/2013 | Vandike | ............. F02M 37/0047 |
| | | | 123/541 |
| 2014/0137953 A1 | 5/2014 | Gibb et al. | |
| 2014/0150884 A1 | 6/2014 | Cramer | |
| 2014/0260403 A1 * | 9/2014 | Connell | ................ B60H 1/3202 |
| | | | 62/434 |
| 2014/0261728 A1 * | 9/2014 | Erasala | .............. F02M 21/0239 |
| | | | 137/15.01 |
| 2016/0061136 A1 * | 3/2016 | Tsutsumi | ................ G01N 15/06 |
| | | | 73/114.43 |
| 2016/0368373 A1 * | 12/2016 | Dudar | ................... B60K 15/077 |
| 2017/0015176 A1 * | 1/2017 | Ulrey | ..................... B60H 1/321 |
| 2017/0369080 A1 * | 12/2017 | Mijin | ..................... B60H 1/034 |
| 2017/0370332 A1 * | 12/2017 | Kondrk | .................. F25D 11/003 |
| 2018/0050591 A1 | 2/2018 | Dudar et al. | |
| 2020/0217289 A1 * | 7/2020 | Awadi | ....................... B60K 6/48 |
| 2020/0254849 A1 * | 8/2020 | Andrews | ................ B60K 15/03 |

FOREIGN PATENT DOCUMENTS

| | | |
|---|---|---|
| CN | 104153894 A | 11/2014 |
| CN | 204003158 U | 12/2014 |
| CN | 105966233 A | 9/2016 |
| DE | 19841659 A1 | 3/2000 |
| DE | 10115865 A1 | 10/2002 |
| DE | 102005048456 A1 | 4/2007 |
| DE | 102006001039 A1 | 7/2007 |
| EP | 0761489 A2 | 3/1997 |
| EP | 1760290 A2 | 3/2007 |
| EP | 1760390 A2 | 3/2007 |
| EP | 2228526 A2 | 9/2010 |
| EP | 2287458 A2 | 2/2011 |
| JP | 2002235571 A1 | 8/2002 |
| JP | 2007297963 A | 11/2007 |
| KR | 20080049241 A | 6/2008 |
| KR | 20110061382 A | 6/2011 |
| WO | 9523630 A1 | 9/1995 |
| WO | 2012138497 A1 | 10/2012 |
| WO | 2015075545 A1 | 5/2015 |
| WO | 2017208044 A1 | 12/2017 |
| WO | 2018051159 A1 | 3/2018 |

OTHER PUBLICATIONS

Written Opinion for International Application No. PCT/IB2018/001063, International Filing Date Aug. 10, 2018, dated May 21, 2019, 12 pages.

PCT Notification of Transmittal of the International Search Report for International Application No. PCT/IB2016/001475; Report dated Jul. 7, 2017; 7 pages.

Written Opinion of the International Searching Authority for International Application No. PCT/IB2016/001475; Report dated Jul. 7, 2017; 6 pages.

* cited by examiner

CRASH DETECTION SYSTEM FOR TRANSPORT REFRIGERATION UNITS

CROSS REFERENCE TO RELATED APPLICATIONS

This application is a National Stage application of PCT/IB2018/001063, filed Aug. 10, 2018.

BACKGROUND

The subject matter disclosed herein generally relates to transport refrigeration systems and more specifically, the fuel systems of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transport refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven. Transport refrigeration systems may also be electrically driven. In an electrically driven transport refrigeration system, a prime mover carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

The prime mover typically is an engine carried on and considered part of the transport refrigeration unit, while the vehicle includes a separate engine to power the vehicle. Commonly, the engine of the vehicle and the engine of the transport refrigeration unit have separate fuel lines connecting tanks to engines. The fuel tanks, engine, and the fuel lines form the overall fuel system. Problems in the fuel system may lead to damage to the overall transport refrigeration system and thus a system for monitoring the fuel system is desired.

BRIEF SUMMARY

According to one embodiment, a transport refrigeration system is provided. The transport refrigeration system including: a first engine configured to power a refrigeration unit; a first fuel tank fluidly connected to the first engine through a first fuel line, the first fuel tank configured to supply fuel to the first engine through the first fuel line; a first shut off valve located within the first fuel line proximate the first fuel tank; a second shut off valve located within the first fuel line proximate the first engine; a sensor system configured to detect at least one of a crash of the transport refrigeration unit, a crash of the first fuel tank, a fuel leak in the first fuel line, and an engine stall in the first engine, the sensor system comprising a fuel tank crash detection sensor located proximate the first fuel tank, wherein the fuel tank crash detection sensor is configured to detect an acceleration of the first fuel tank; a controller configured to control the operation of at least one of the refrigeration unit, the first engine, the first fuel tank, the first shut off valve, the second shut off valve, and the sensor system; and wherein the controller is configured to close the first shutoff valve and the second shutoff valve when the sensor system detects at least one of a crash of the transport refrigeration unit, a crash of the first fuel tank, a fuel leak in the first fuel line, and an engine stall in the first engine.

In addition to one or more of the features described above, or as an alternative, further embodiments may include that the controller is configured to close the first shutoff valve and the second shutoff valve when the acceleration of the first fuel tank is outside a selected acceleration.

In addition to one or more of the features described above, or as an alternative, further embodiments may include that the sensor system further comprises a transport refrigeration unit crash detection sensor, the transport refrigeration unit crash detection sensor being configured to detect an acceleration of the transport refrigeration unit, and wherein the controller is configured to close the first shutoff valve and the second shutoff valve when the acceleration of the transportation refrigeration unit is outside a selected acceleration.

In addition to one or more of the features described above, or as an alternative, further embodiments may include that the sensor system further comprises at least one fuel pressure sensor in operative association with the first fuel line, the at least one fuel pressure sensor being configured monitor fuel pressure within the first fuel line.

In addition to one or more of the features described above, or as an alternative, further embodiments may include that the controller is configured to close the first shutoff valve and the second shutoff valve when the fuel pressure within the first fuel line is outside a selected fuel pressure range.

In addition to one or more of the features described above, or as an alternative, further embodiments may include that the at least one fuel pressure sensor further includes: a first fuel pressure sensor in operative association with the first fuel line and located proximate the first fuel tank; and a second fuel pressure sensor in operative association with the first fuel line and located proximate the first engine.

In addition to one or more of the features described above, or as an alternative, further embodiments may include that the sensor system further comprises an engine sensor in operative association with the first engine, the engine sensor being configured to monitor a frequency of rotation of the first engine.

In addition to one or more of the features described above, or as an alternative, further embodiments may include that the controller is configured to close the first shutoff valve and the second shutoff valve when the frequency of rotation is outside a selected frequency of rotation range.

In addition to one or more of the features described above, or as an alternative, further embodiments may include that the fuel is at least one of compressed natural gas and liquefied natural gas.

According to another embodiment, a method of operating a transport refrigeration system is provided. The method including: powering a refrigeration unit using a first engine; supplying fuel to the first engine from a first fuel tank, the first fuel tank being fluidly connected to the first engine through a first fuel line; detecting, using a sensor system, at least one of a crash of the transport refrigeration unit, a crash of the first fuel tank, a fuel leak in the first fuel line, and an engine stall in the first engine, the sensor system comprising a fuel tank crash detection sensor located proximate the first fuel tank, wherein the fuel tank crash detection sensor is configured to detect an acceleration of the first fuel tank; closing, using a controller, a first shutoff valve when the sensor system detects at least one of a crash of the transport refrigeration unit, a crash of the first fuel tank, a fuel leak in the first fuel line, and an engine stall in the first engine, the first shutoff valve being located within the first fuel line proximate the first fuel tank; and closing, using the controller, a second shutoff valve when the sensor system detects at least one of a crash of the transport refrigeration unit, a crash of the first fuel tank, a crash of the first fuel tank, a fuel leak in the first fuel line, and an engine stall in the first engine, the second shutoff valve being located within the first fuel line proximate the second fuel tank.

In addition to one or more of the features described above, or as an alternative, further embodiments may include: detecting an acceleration of the first fuel tank with the fuel tank crash detection sensor; and closing, using the controller, the first shutoff valve and the second shutoff valve when the acceleration of the fuel tank is outside a selected acceleration.

In addition to one or more of the features described above, or as an alternative, further embodiments may include: detecting an acceleration of the transport refrigeration unit with a transport refrigeration unit crash detection sensor; and closing, using the controller, the first shutoff valve and the second shutoff valve when the acceleration of the transportation refrigeration unit is outside a selected acceleration.

In addition to one or more of the features described above, or as an alternative, further embodiments may include: monitoring fuel pressure within the first fuel line using at least one fuel pressure sensor in operative association with the first fuel line.

In addition to one or more of the features described above, or as an alternative, further embodiments may include: closing, using the controller, the first shutoff valve and the second shutoff valve when the fuel pressure within the first fuel line is outside a selected fuel pressure range.

In addition to one or more of the features described above, or as an alternative, further embodiments may include that the at least one fuel pressure sensor further includes: a first fuel pressure sensor in operative association with the first fuel line and located proximate the first fuel tank; and a second fuel pressure sensor in operative association with the first fuel line and located proximate the first engine.

In addition to one or more of the features described above, or as an alternative, further embodiments may include: monitoring a frequency of rotation of the first engine.

In addition to one or more of the features described above, or as an alternative, further embodiments may include that the controller is configured to close the first shutoff valve and the second shutoff valve when the frequency of rotation is outside a selected frequency of rotation range.

In addition to one or more of the features described above, or as an alternative, further embodiments may include that the fuel is at least one of compressed natural gas and liquefied natural gas.

According to another embodiment, a computer program product tangibly embodied on a computer readable medium is provided. The computer program product including instructions that, when executed by a processor, cause the processor to perform operations comprising: powering a refrigeration unit of a transport refrigeration system using a first engine; supplying fuel to the first engine from a first fuel tank, the first fuel tank being fluidly connected to the first engine through a first fuel line; detecting, using a sensor system, at least one of a crash of the transport refrigeration unit, a crash of the first fuel tank, a fuel leak in the first fuel line, and an engine stall in the first engine, the sensor system comprising a fuel tank crash detection sensor located proximate the first fuel tank, wherein the fuel tank crash detection sensor is configured to detect an acceleration of the first fuel tank; closing, using a controller, a first shutoff valve when the sensor system detects at least one of a crash of the transport refrigeration unit, a crash of the first fuel tank, a fuel leak in the first fuel line, and an engine stall in the first engine, the first shutoff valve being located within the first fuel line proximate the first fuel tank; and closing, using the controller, a second shutoff valve when the sensor system detects at least one of a crash of the transport refrigeration unit, a crash of the first fuel tank, a fuel leak in the first fuel line, and an engine stall in the first engine, the second shutoff valve being located within the first fuel line proximate the second fuel tank.

In addition to one or more of the features described above, or as an alternative, further embodiments may include that the controller is configured to close the first shutoff valve and the second shutoff valve when the acceleration of the first fuel tank is outside a selected acceleration.

In addition to one or more of the features described above, or as an alternative, further embodiments may include that the sensor system further comprises a transport refrigeration unit crash detection sensor, the transport refrigeration unit crash detection sensor being configured to detect an acceleration of the transport refrigeration unit, and wherein the controller is configured to close the first shutoff valve and the second shutoff valve when the acceleration of the transportation refrigeration unit is outside a selected acceleration.

In addition to one or more of the features described above, or as an alternative, further embodiments may include that the sensor system further comprises at least one fuel pressure sensor in operative association with the first fuel line, the at least one fuel pressure sensor being configured monitor fuel pressure within the first fuel line.

In addition to one or more of the features described above, or as an alternative, further embodiments may include that the controller is configured to close the first shutoff valve and the second shutoff valve when the fuel pressure within the first fuel line is outside a selected fuel pressure range.

In addition to one or more of the features described above, or as an alternative, further embodiments may include that the at least one fuel pressure sensor further includes: a first fuel pressure sensor in operative association with the first fuel line and located proximate the first fuel tank; and a second fuel pressure sensor in operative association with the first fuel line and located proximate the first engine.

In addition to one or more of the features described above, or as an alternative, further embodiments may include that the sensor system further comprises an engine sensor in operative association with the first engine, the engine sensor being configured to monitor a frequency of rotation of the first engine.

In addition to one or more of the features described above, or as an alternative, further embodiments may include that the controller is configured to close the first shutoff valve and the second shutoff valve when the frequency of rotation is outside a selected frequency of rotation range.

In addition to one or more of the features described above, or as an alternative, further embodiments may include that the fuel is at least one of compressed natural gas and liquefied natural gas.

Technical effects of embodiments of the present disclosure include a fuel line sensor system for a transport refrigeration unit of a transportation refrigeration system that closes fuel shut-off valves when the sensor system detects at least one of a crash of the transport refrigeration unit, a crash of the first fuel tank, a fuel leak in the fuel line, and an engine stall in the engine.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
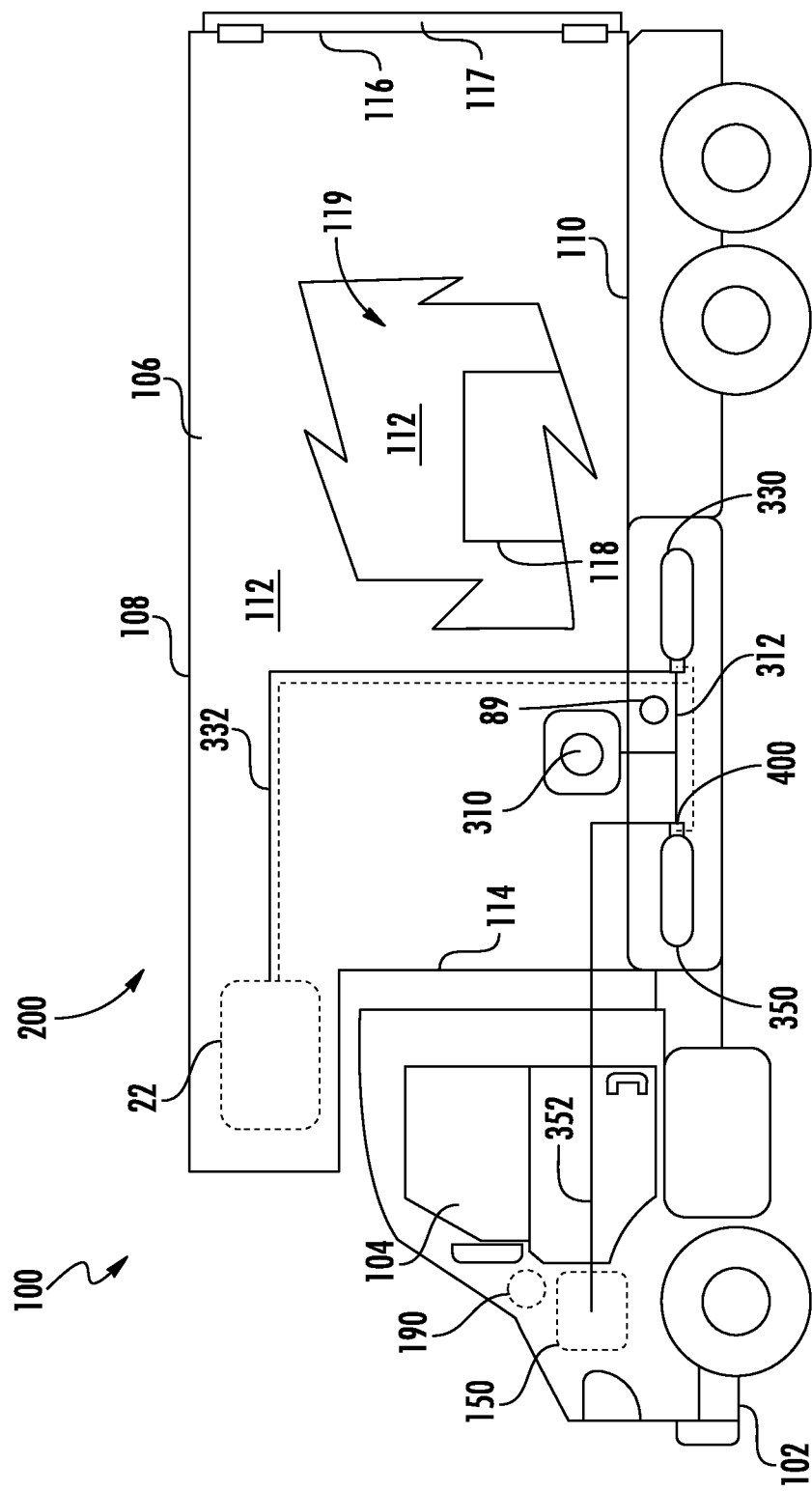
FIG. 1 is a schematic illustration of a transport refrigeration system, according to an embodiment of the present disclosure.
Figure 2:
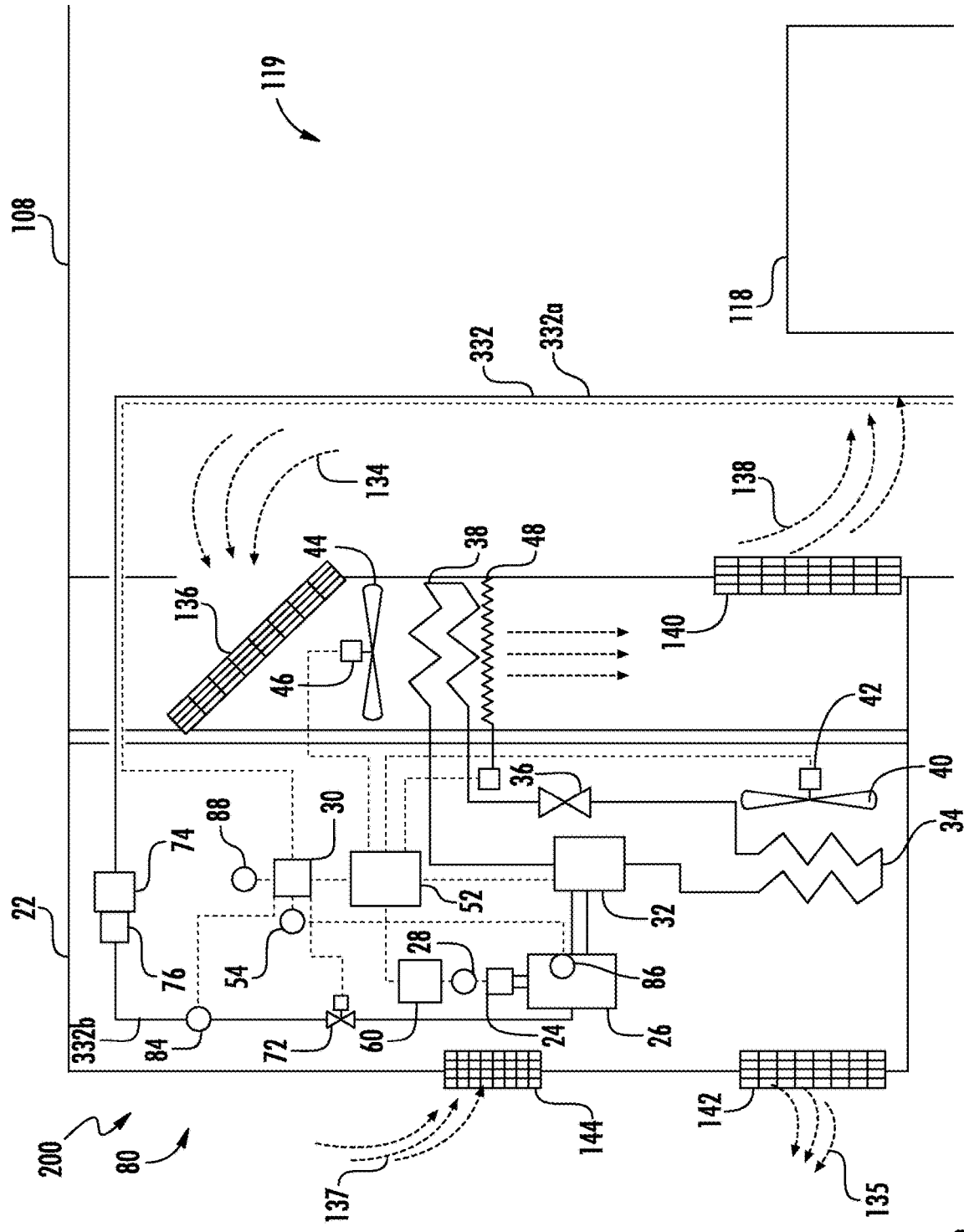
FIG. 2 is an enlarged schematic illustration of the transport refrigeration system of FIG. 1, according to an embodiment of the present disclosure.
Figure 3:
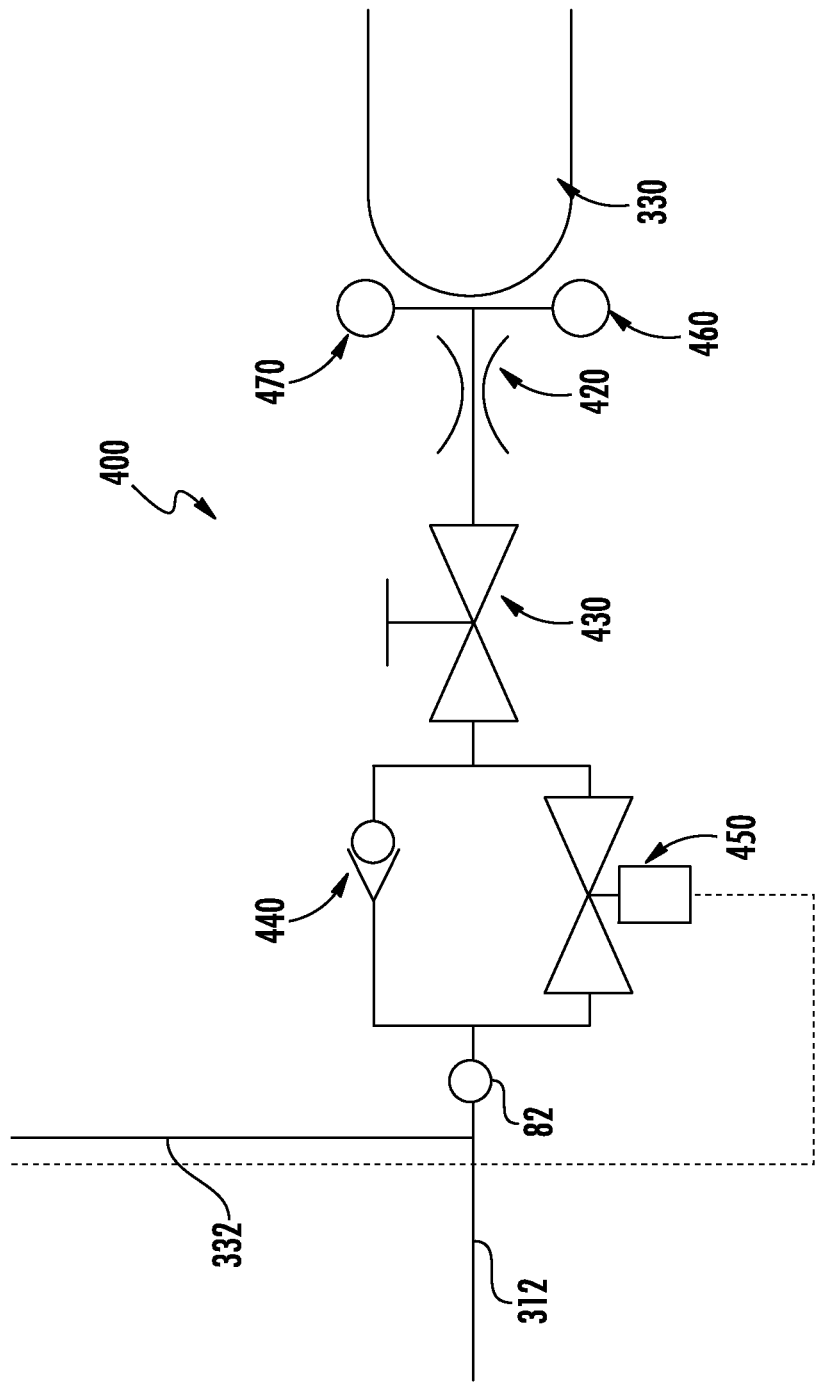
FIG. 3 is a schematic illustration of a tank connection device connected to a first fuel tank, according to an embodiment of the present disclosure.
Figure 4:
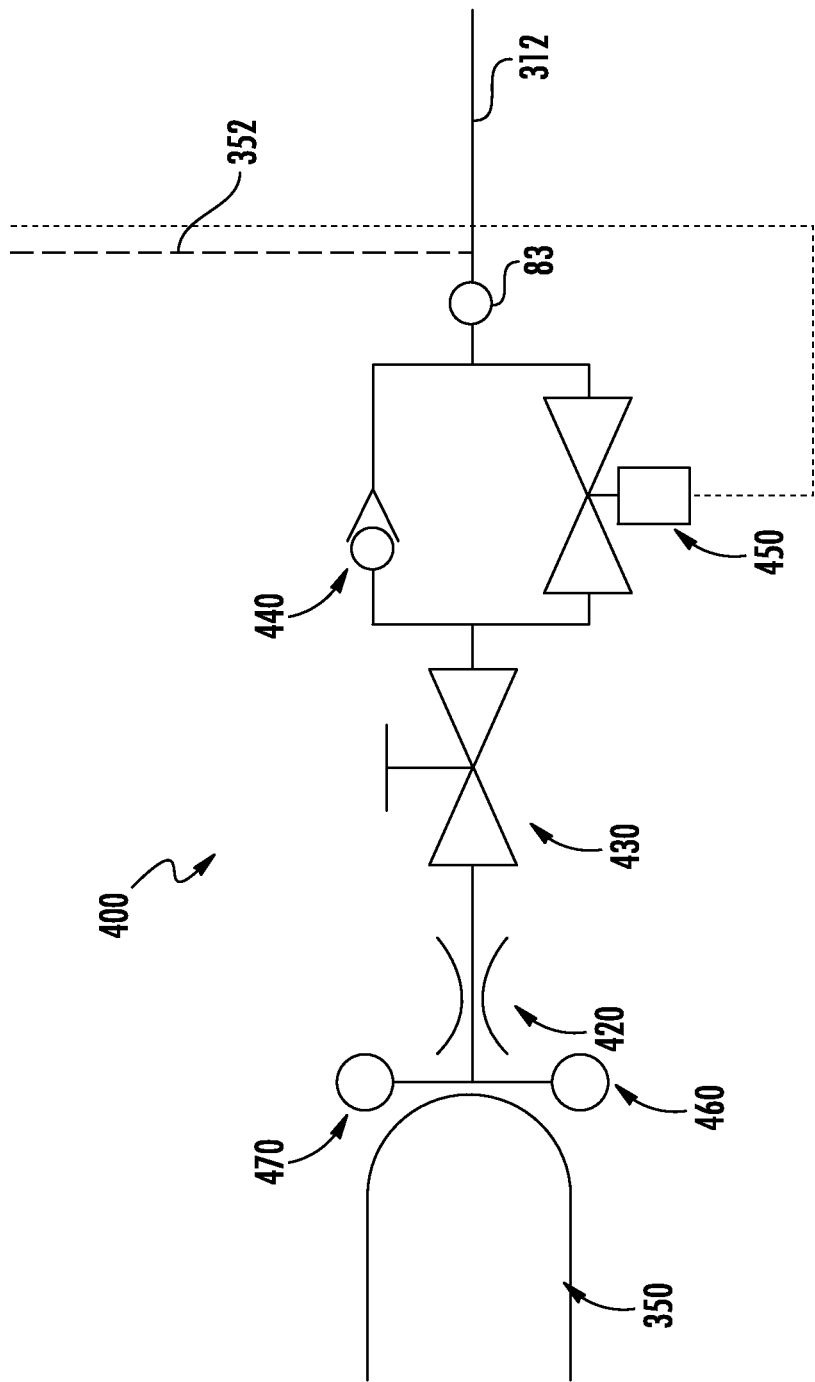
FIG. 4 is a schematic illustration of the tank connection device connected to a second fuel tank, according to an embodiment of the present disclosure.

Referring to FIGS. 1-4, various embodiments of the present disclosure are illustrated. FIG. 1 shows a schematic illustration of a transport refrigeration system 200, according to an embodiment of the present disclosure. FIG. 2 shows an enlarged schematic illustration of the transport refrigeration system 200 of FIG. 1, according to an embodiment of the present disclosure. FIG. 3 shows a schematic illustration of a tank connection device 400 connected to a first fuel tank 330, according to an embodiment of the present disclosure. FIG. 4 shows a schematic illustration of the tank connection device 400 connected to a second fuel tank 350, according to an embodiment of the present disclosure.

The transport refrigeration system 200 is being illustrated as a trailer system 100, as seen in FIG. 1. The trailer system 100 includes a vehicle 102 and a transport container 106. The vehicle 102 includes an operator's compartment or cab 104 and a second engine 150 which acts as the drive system of the trailer system 100. The fuel that powers the second engine 150 may be at least one of compressed natural gas and liquefied natural gas. In an embodiment, the fuel is compressed natural gas. In the illustrated embodiment, the fuel to power the second engine 150 of the vehicle 102 is stored in a second fuel tank 350. The second fuel tank 350 is fluidly connected to the second engine 150 through a second fuel line 352. The second fuel tank 350 is configured to supply fuel to the second engine 150 through the second fuel line 352. The transport container 106 is coupled to the vehicle 102. The transport container 106 is a refrigerated trailer and includes a top wall 108, a directly opposed bottom wall 110, opposed side walls 112, and a front wall 114, with the front wall 114 being closest to the vehicle 102. The transport container 106 further includes a door or doors 117 at a rear wall 116, opposite the front wall 114. The walls of the transport container 106 define a refrigerated cargo space 119. It is appreciated by those of skill in the art that embodiments described herein may be applied to non-trailer refrigeration such as, for example a rigid truck or a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a refrigeration unit 22, a refrigerant compression device 32, a first engine 26 for driving the refrigerant compression device 32, and a controller 30. The refrigeration unit 22 functions, under the control of the controller 30, to establish and regulate a desired environmental parameters, such as, for example temperature, pressure, humidity, carbon dioxide, ethylene, ozone, light exposure, vibration exposure, and other conditions in the interior compartment 119, as known to one of ordinary skill in the art. In an embodiment, the refrigeration unit 22 is capable of providing a desired temperature and humidity range.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include a heater 48 associated with the refrigerant heat absorption heat exchanger 38. In an embodiment, the heater 48 may be an electric resistance heater. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes across flow path to the heat outlet 142. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending across flow path from a return air inlet 136. The fan(s) 44 are operative to pass air drawn from the refrigerated cargo space 119 across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the refrigerated cargo space 119 through a refrigeration unit outlet 140. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The refrigerant compression device 32 may be directly driven by the first engine 26 connected to the refrigerant by mechanical connection, such as, for example a drive shaft or belt. Alternatively, the first engine 26 may drive a power generation device, which may provide power to an electric motor to drive the refrigerant compression device 32.

The transport refrigeration system 200 also includes a controller 30 configured for controlling the operation of the transport refrigeration system 200 including, but not limited to, the operation of various components of the refrigerant unit 22 to provide and maintain a desired thermal environment within the refrigerated cargo space 119. The controller 30 may also be able to selectively operate the first engine 26, typically through an electronic engine controller 54 operatively associated with the first engine 26. The controller 30 may be an electronic controller including a processor and an associated memory comprising computer-executable instructions that, when executed by the processor, cause the processor to perform various operations. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be a storage device such as, for example, a random access memory (RAM), read only memory (ROM), or other electronic, optical, magnetic or any other computer readable medium.

In the depicted embodiment, the first engine 26 drives a power generation device 24 to provide electrical power to the refrigeration unit 22. The drive shaft of the engine drives the electric generation device 24. The electric generation device 24 may comprise a single on-board, engine driven AC generator configured to generate alternating current (AC) power including at least one AC voltage at one or more frequencies. In an embodiment, the electric generation device 24 may, for example, be a permanent magnet AC generator or a synchronous AC generator. In another embodiment, the electric generation device 24 may comprise a single on-board, engine driven DC generator configured to generate direct current (DC) power at least one voltage. Some electric generation devices may have internal voltage regulators while other electric generation devices do not. As each of the fan motors 42, 46 may be an AC motor or a DC motor, it is to be understood that various power converters 52, such as AC to DC rectifiers, DC to AC inverters, AC to AC voltage/frequency converters, and DC to DC voltage converters, may be employed in connection with the electric generation device 24 as appropriate. The transport refrigeration system 200 may include a voltage sensor 28 to sense the voltage of the electric generation device 24.

The electrical power generated by the power generation device 24 may be stored in a battery 60. The refrigeration unit 22 has a plurality of power demand loads, including, but not limited to, the drive motor 42 for the fan 40 associated with the refrigerant heat rejection heat exchanger 34, and the drive motor 46 for the fan 44 associated with the refrigerant heat absorption heat exchanger 38. In the depicted embodiment, the heater 48 also constitutes a power demand load. The electric resistance heater 48 may be selectively operated by the controller 30 whenever a control temperature within the temperature controlled cargo box drops below a preset lower temperature limit, which may occur in a cold ambient environment. In such an event the controller 30 would activate the heater 48 to heat air circulated over the heater 48 by the fan(s) 44 associated with the refrigerant heat absorption heat exchanger 38. The heater 48 may also be used to de-ice the return air intake 136.

The fuel that powers the first engine 26 may be at least one of compressed natural gas and liquefied natural gas. In an embodiment, the fuel is compressed natural gas. In another embodiment, the fuel that powers the first engine 26 is the same fuel that powers the second engine 150 of the vehicle 102. In the illustrated embodiment, the fuel to power the first engine 26 is stored in a first fuel tank 330. The first fuel tank 330 is fluidly connected to the first engine 26 through a first fuel line 332. The first fuel tank 330 is configured to supply fuel to the first engine 26 through the first fuel line 332.

Airflow is circulated into and through the refrigerate cargo space 119 of the transport container 106 by means of the refrigeration unit 22. A return airflow 134 flows into the refrigeration unit 22 from the refrigerated cargo space 119 through the refrigeration unit return air intake 136, and across the refrigerant heat absorption heat exchanger 38 via the fan 44, thus conditioning the return airflow 134 to a selected or predetermined temperature. The conditioned return airflow 134, now referred to as supply airflow 138, is supplied into the refrigerated cargo space 119 of the transport container 106 through the refrigeration unit outlet 140. Heat 135 is removed from the refrigerant heat rejection heat exchanger 34 through the heat outlet 142. The refrigeration unit 22 may contain an external air inlet 144, as shown in FIG. 2, to aid in the removal of heat 135 from the refrigerant heat rejection heat exchanger 34 by pulling in external air 137. The supply airflow 138 may cool the perishable goods 118 in the refrigerated cargo space 119 of the transport container 106. It is to be appreciated that the refrigeration unit 22 can further be operated in reverse to warm the container system 106 when, for example, the outside temperature is very low. In the illustrated embodiment, the return air intake 136, the refrigeration unit outlet 140, the heat outlet 142, and the external air inlet 144 are configured as grilles to help prevent foreign objects from entering the refrigeration unit 22.

In the illustrated embodiment, the transport refrigeration system 200 includes a single filling point 310. The single filling point 310 is fluidly connected to the second fuel tank 350 and the first fuel tank 330 through a filling line 312. The single filling point 310 is configured to receive fuel from a filling station, such as for example a gas station. When the single filling point 310 receives fuel, the single filling point 310 distributes the fuel received to the second fuel tank 350 and the first fuel tank 330. Advantageously, a single filling point offers both convenience and simplicity that will help refrigeration system operators save time and money. Also advantageously, having a single filling point but maintaining separate fuel lines to the engine and the engine of the refrigeration unit, allows the refrigeration unit to maintain operation even when the engine of the vehicle is turned off. As may be appreciated by one of skill in the art, the first fuel tank 330 and second fuel tank 350 may each have an individual filling point to fill the respective tank with fuel.

Further, as may be appreciated by one of skill in the art, there may be multiple first fuel tanks 330 and multiple second fuel tanks depending on the fuel requirements of the engines 26, 150. The first fuel tank 330 and the second fuel tank 350 each include a tank connection device 400, as seen in FIG. 1. The tank connection device 400 fluidly connects each tank to a single filling point 310 through the filling line 312, as shown in FIG. 1. As shown in FIGS. 3 and 4, the tank connection device 400 comprises: a pressure regulator 420 fluidly connected to one of the fuel tanks 330, 350; a thermal fuse 470; a bursting disk 460; a manual valve 430 fluidly connected to the pressure regulator 420; a check valve 440 fluidly connected to the manual valve 430 and the single refilling point 310; and a first shut off valve 450 fluidly connected to the manual valve 430 and the single refilling point 310. As illustrated in FIG. 3, the first shut off valve 450 may be fluidly connected in parallel to the check valve 440. The first shut off valve 450 may be a solenoid valve. The check valve 440 and the first shut off valve 450 are connected to the single refilling point 310 through the filling line 312. Further, in regard to the second fuel tank 350, the check valve 440 and the first shut off valve 450 are connected to the second engine 150 through the second fuel line 352, as seen in FIG. 4. Also, in regard to the first fuel tank 330, the check valve 440 and the first shut off valve 450 are connected to the first engine 26 through the first fuel line 332, as seen in FIG. 4. Advantageously, the tank connection device 400 helps prevent the fuel tanks from being over filled and also allows the fuel to be consumed as commanded.

Further, in the illustrated embodiment, the first fuel line 332 comprises two shut off valves controlled by the controller 30: a first shut off valve 450 located within the first fuel line 332 proximate the first fuel tank 330 and a second shut off valve 72 located within the first fuel line 332 proximate the first engine 26. The second shut off 72 may also be a solenoid valve. The second fuel line 352 may have similar shutoff valves between the second fuel tank 350 and the second engine 150. The first shut off valve 450 and the second shut off valve 72 are in operative communication with the controller 30 and the controller 30 controls the operation of the shut off valves 450, 72.

As seen in FIG. 2, the first fuel line 332 may have a regulator 74 and a pressure relief valve 76. The regulator 74 reduces the pressure of the fuel coming from the first fuel tank 330 to the first engine 26. Subsequently, the regulator 74 divides the first fuel line 332 into two portions, a high pressure portion 332a and a low pressure portion 332b. The pressure relief valve 76 may relieve pressure in the first fuel line 332 in the event pressure exceeds a selected value.

The first fuel line 332 also comprises: a first fuel pressure sensor 82 in operative association with the first fuel line 332 and located proximate the first fuel tank 330; and a second fuel pressure sensor 84 in operative association with the first fuel line 332 and located proximate the first engine 26. The first fuel pressure sensor 82 is located in the high pressure portion 332a of the first fuel line 332 and thus may be a high pressure sensor. The second fuel pressure sensor 84 is located in the low pressure portion 332b of the first fuel line 332 and thus may be a low pressure sensor. The second fuel line 352 may have a similar high pressure sensor 83, a regulator (not shown), a pressure relief valve (not shown), a second shutoff valve (not shown), and low pressure sensor (not shown) between the second fuel tank 350 and the second engine 150. The first fuel pressure sensor 82 and the second fuel pressure sensor 84 help compose a sensor system 80, which may include various other sensors along the first fuel line 332 and throughout the transportation refrigeration system, in addition to sensors 82, 84. In the illustrated embodiment, the sensor system 80 comprises the first fuel pressure sensor 82, the second fuel pressure sensor 84, an engine sensor 86, a transport refrigeration unit crash detection sensor 88, and a fuel tank crash detection sensor 89. As shown in FIG. 2, the transport refrigeration unit crash detection sensor 88 is located proximate or in the transport refrigeration unit 22. As shown in FIG. 1, the fuel tank crash detection sensor 89 is located proximate the first fuel tank 330.

The first fuel pressure sensor 82 and the second fuel pressure sensor 84 are in operative communication with the controller 30 and the controller 30 controls the operation of the fuel pressure sensors 82, 84. The controller 30 is configured to close the first shutoff valve 450 and the second shutoff valve 72 when the fuel pressure within the first fuel line 332 is outside a selected fuel pressure range. The first fuel pressure sensor 82 and the second fuel pressure sensor 84 may each have a different selected fuel pressure range due to the first fuel pressure sensor 82 being in the high pressure portion 332a and the second fuel pressure sensor 84 being in the low pressure portion 332b.

The sensor system 80 further comprises an engine sensor 86 in operative association with the first engine 26. The engine sensor 86 is configured to monitor a frequency of rotation of the first engine 26, such as, for example the rotations per minute (RPM) of the engine. The engine sensor 86 is in operative communication with the controller 30 and the controller 30 controls the operation of the engine sensor 86. The controller 30 is configured to close the first shutoff valve 450 and the second shutoff valve 72 when the frequency of rotation is outside a selected frequency of rotation range. The frequency of rotation being outside the selected frequency of rotation range may indicate that the first engine 26 is stalling and thus the fuel flow to the first engine 26 should be halted by closing the shutoff valves 450, 72. As seen in FIG. 2, the transport refrigeration unit crash detection sensor 86 may be located within the transport refrigeration unit 22. The second engine 150 may also have a crash detection sensor 190 that may be located proximate the second engine 150, as seen in FIG. 1.

The sensor system 80 further comprises a transport refrigeration unit crash detection sensor 88. The transport refrigeration unit crash detection sensor 88 is configured to detect an acceleration of the transport refrigeration unit 22. The transport refrigeration unit crash detection sensor 88 may be an inertia sensor such as an accelerometer and/or pressure sensor. The transport refrigeration unit crash detection sensor 88 is in operative communication with the controller 30 and the controller 30 controls the operation of the engine sensor 86. The controller 30 is configured to close the first shutoff valve 450 and the second shutoff valve 72 when the acceleration of the transport refrigeration unit 22 is outside a selected acceleration. The acceleration of the transport refrigeration unit 22 being outside a selected acceleration may indicate that the transport refrigeration unit 22 has been involved in a crash and thus the fuel flow to the first engine 26 should be halted by closing the shutoff valves 450, 72.

The sensor system 80 further comprises a fuel tank crash detection sensor 89. The fuel tank crash detection sensor 89 is configured to detect an acceleration of the first fuel tank 330 that supplies fuel to the first engine 26. The fuel tank crash detection sensor 89 may be an inertia sensor such as an accelerometer and/or pressure sensor. The fuel tank crash detection sensor 89 is in operative communication with the controller 30 and the controller 30 controls the operation of the engine sensor 86. The controller 30 is configured to close the first shutoff valve 450 and the second shutoff valve 72 when the acceleration of the first fuel tank 330 is outside a selected acceleration. The acceleration of the first fuel tank 330 being outside a selected acceleration may indicate that the first fuel tank 330 has been involved in a crash and thus the fuel flow to the first engine 26 should be halted by closing the shutoff valves 450, 72.

Advantageously, the fuel tank crash detection sensor 89 increases reliability and safety by adding a separate crash detection sensor separated from the first crash detection 88 to detect accelerations proximate to the first fuel tank 330. For instance, the transport refrigeration unit crash detection sensor 88 may be helpful in detecting crashes near the top of the trailer system 100 (e.g. a crash with an overhead bridge), whereas the fuel tank crash detection sensor 89 may be helpful in detecting crashes near the bottom of the trailer system 100 (e.g., a crash with a car). In an embodiment, the fuel flow to the first engine 26 may be halted by closing the shutoff valves 450, 72 in response to an acceleration detected from at least one of the transport refrigeration unit crash detection sensor 88 and the fuel tank crash detection sensor 89.

Figure 5:
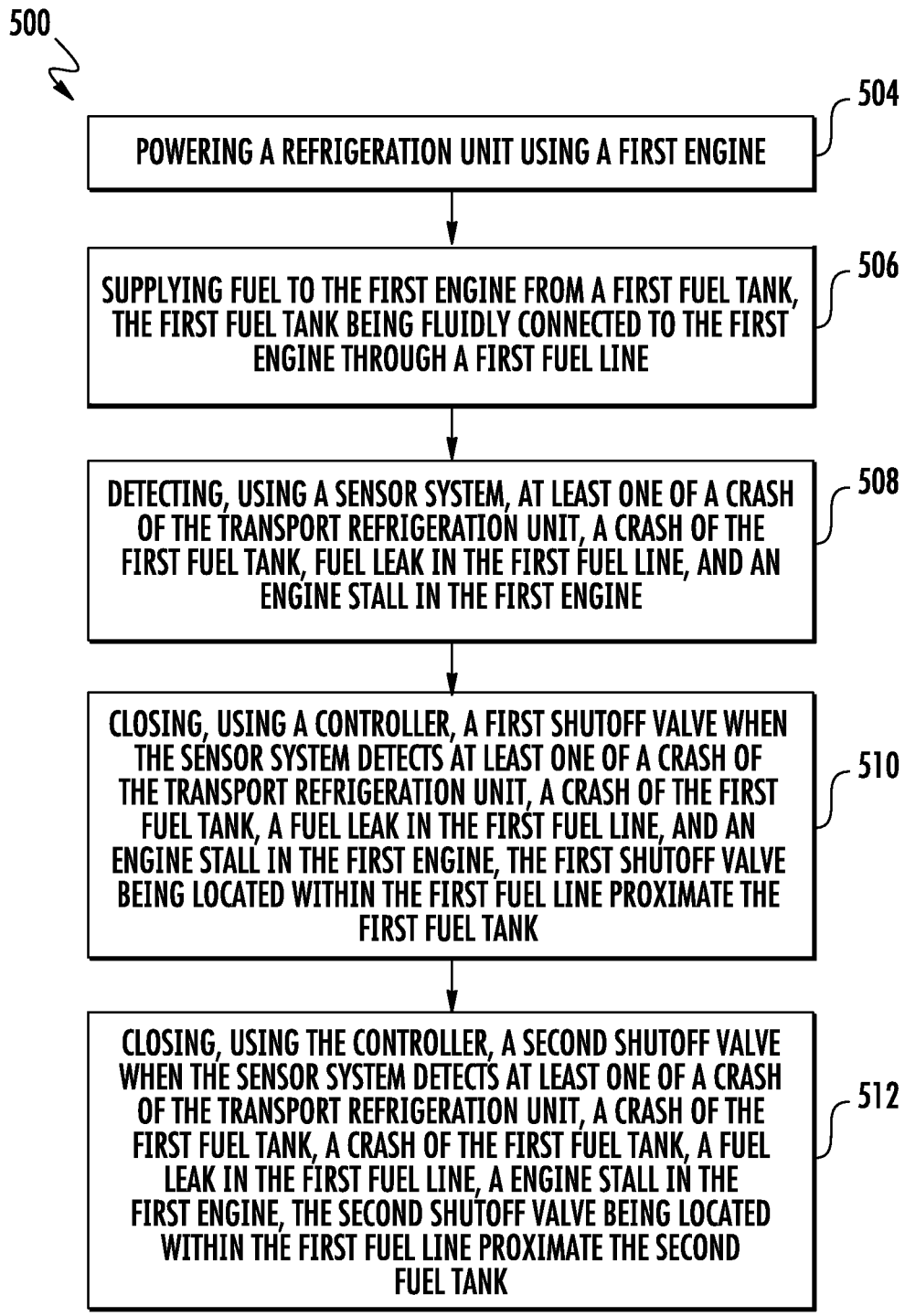
FIG. 5 is a flow diagram illustrating a method for operating a transport refrigeration system, according to an embodiment of the present disclosure.

Referring now to FIG. 5, while referencing components of the transport refrigeration system 200 of FIGS. 1-4. FIG. 5 shows a flow process illustrating a method 500 of operating the transport refrigeration system 200, according to an embodiment of the present disclosure. At block 504, the first engine 26 powers the refrigeration unit 22. At block 506, the first fuel tank 330 supplies fuel to the first engine 26 through the first fuel line 332. At block 508, the sensor system 80 detects at least one of a crash of the transport refrigeration unit 22, a crash of the first fuel tank 330, a fuel leak in the first fuel line 332, and an engine stall in the first engine 26. At block 510, the controller 30 closes the first shutoff valve 450 when the sensor system 80 detects at least one of a crash of the transport refrigeration unit 22, a crash of the first fuel tank 330, a fuel leak in the first fuel line 332, and an engine stall in the first engine 26. As mentioned above, the first shutoff valve 450 is located within the first fuel line 332 proximate the first fuel tank 330. At block 512, the controller 30 closes the second shutoff valve 72 when the sensor system 80 detects at least one of a crash of the transport refrigeration unit 22, a crash of the first fuel tank 330, a fuel leak in the first fuel line 332, and an engine stall in the first engine 26. As mentioned above, the second shutoff valve 72 is located within the first fuel line 332 proximate the first engine 26.

While the above description has described the flow process of FIG. 5 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A transport refrigeration system comprising:
a first engine configured to power a refrigeration unit;
a first fuel tank fluidly connected to the first engine through a first fuel line, the first fuel tank configured to supply fuel to the first engine through the first fuel line;
a first shut off valve located within the first fuel line proximate the first fuel tank;
a second shut off valve located within the first fuel line proximate the first engine;
a sensor system configured to detect at least one of a crash of the transport refrigeration unit, a crash of the first fuel tank, a fuel leak in the first fuel line, and an engine stall in the first engine, the sensor system comprising a fuel tank crash detection sensor located proximate the first fuel tank, wherein the fuel tank crash detection sensor is configured to detect an acceleration of the first fuel tank;
a controller configured to control the operation of at least one of the refrigeration unit, the first engine, the first fuel tank, the first shut off valve, the second shut off valve, and the sensor system; and
wherein the controller is configured to close the first shutoff valve and the second shutoff valve when the sensor system detects at least one of a crash of the transport refrigeration unit, a crash of the first fuel tank, a fuel leak in the first fuel line, and an engine stall in the first engine.

2. The transport refrigeration system of claim 1, wherein the controller is configured to close the first shutoff valve and the second shutoff valve when the acceleration of the first fuel tank is outside a selected acceleration.

3. The transport refrigeration system of claim 1, wherein the sensor system further comprises a transport refrigeration unit crash detection sensor, the transport refrigeration unit crash detection sensor being configured to detect an acceleration of the transport refrigeration unit, and wherein the controller is configured to close the first shutoff valve and the second shutoff valve when the acceleration of the transportation refrigeration unit is outside a selected acceleration.

4. The transport refrigeration system of claim 1, wherein the sensor system further comprises at least one fuel pressure sensor in operative association with the first fuel line, the at least one fuel pressure sensor being configured monitor fuel pressure within the first fuel line.

5. The transport refrigeration system of claim 4, wherein the controller is configured to close the first shutoff valve and the second shutoff valve when the fuel pressure within the first fuel line is outside a selected fuel pressure range.

6. The transport refrigeration system of claim 5, wherein the at least one fuel pressure sensor further comprises:
a first fuel pressure sensor in operative association with the first fuel line and located proximate the first fuel tank; and
a second fuel pressure sensor in operative association with the first fuel line and located proximate the first engine.

7. The transport refrigeration system of claim 1, wherein the sensor system further comprises an engine sensor in operative association with the first engine, the engine sensor being configured to monitor a frequency of rotation of the first engine.

8. The transport refrigeration system of claim 7, wherein the controller is configured to close the first shutoff valve and the second shutoff valve when the frequency of rotation is outside a selected frequency of rotation range.

9. The transport refrigeration system of claim 1, wherein the fuel is at least one of compressed natural gas and liquefied natural gas.

10. A method of operating a transport refrigeration system, the method comprising:
powering a refrigeration unit using a first engine;
supplying fuel to the first engine from a first fuel tank, the first fuel tank being fluidly connected to the first engine through a first fuel line;
detecting, using a sensor system, at least one of a crash of the transport refrigeration unit, a crash of the first fuel tank, a fuel leak in the first fuel line, and an engine stall in the first engine, the sensor system comprising a fuel tank crash detection sensor located proximate the first fuel tank, wherein the fuel tank crash detection sensor is configured to detect an acceleration of the first fuel tank;
closing, using a controller, a first shutoff valve when the sensor system detects at least one of a crash of the transport refrigeration unit, a crash of the first fuel tank, a fuel leak in the first fuel line, and an engine stall in the first engine, the first shutoff valve being located within the first fuel line proximate the first fuel tank; and
closing, using the controller, a second shutoff valve when the sensor system detects at least one of a crash of the transport refrigeration unit, a crash of the first fuel tank, a crash of the first fuel tank, a fuel leak in the first fuel line, and an engine stall in the first engine, the second shutoff valve being located within the first fuel line proximate the second fuel tank.

11. The method of claim 10, further comprising:
detecting an acceleration of the first fuel tank with the fuel tank crash detection sensor; and
closing, using the controller, the first shutoff valve and the second shutoff valve when the acceleration of the fuel tank is outside a selected acceleration.

12. The method of claim 10, further comprising:
detecting an acceleration of the transport refrigeration unit with a transport refrigeration unit crash detection sensor; and
closing, using the controller, the first shutoff valve and the second shutoff valve when the acceleration of the transportation refrigeration unit is outside a selected acceleration.

13. The method of claim 10, further comprising:
monitoring fuel pressure within the first fuel line using at least one fuel pressure sensor in operative association with the first fuel line.

14. The method of claim 13, further comprising:
closing, using the controller, the first shutoff valve and the second shutoff valve when the fuel pressure within the first fuel line is outside a selected fuel pressure range.

15. The method of claim 14, wherein the at least one fuel pressure sensor further comprises:
a first fuel pressure sensor in operative association with the first fuel line and located proximate the first fuel tank; and
a second fuel pressure sensor in operative association with the first fuel line and located proximate the first engine.

16. The method of claim 10, further comprising:
monitoring a frequency of rotation of the first engine.

17. The method of claim 16, wherein the controller is configured to close the first shutoff valve and the second shutoff valve when the frequency of rotation is outside a selected frequency of rotation range.

18. The method of claim 10, wherein the fuel is at least one of compressed natural gas and liquefied natural gas.

19. A computer program product tangibly embodied on a computer readable medium, the computer program product including instructions that, when executed by a processor, cause the processor to perform operations comprising:
  powering a refrigeration unit of a transport refrigeration system using a first engine;
  supplying fuel to the first engine from a first fuel tank, the first fuel tank being fluidly connected to the first engine through a first fuel line;
  detecting, using a sensor system, at least one of a crash of the transport refrigeration unit, a crash of the first fuel tank, a fuel leak in the first fuel line, and an engine stall in the first engine, the sensor system comprising a fuel tank crash detection sensor located proximate the first fuel tank, wherein the fuel tank crash detection sensor is configured to detect an acceleration of the first fuel tank;
  closing, using a controller, a first shutoff valve when the sensor system detects at least one of a crash of the transport refrigeration unit, a crash of the first fuel tank, a fuel leak in the first fuel line, and an engine stall in the first engine, the first shutoff valve being located within the first fuel line proximate the first fuel tank; and
  closing, using the controller, a second shutoff valve when the sensor system detects at least one of a crash of the transport refrigeration unit, a crash of the first fuel tank, a fuel leak in the first fuel line, and an engine stall in the first engine, the second shutoff valve being located within the first fuel line proximate the second fuel tank.

20. The computer program product of claim 19, wherein the controller is configured to close the first shutoff valve and the second shutoff valve when the acceleration of the first fuel tank is outside a selected acceleration.

* * * * *